United States Patent [19]
Shiflett et al.

[11] Patent Number: 5,589,098
[45] Date of Patent: Dec. 31, 1996

[54] COMPOSITIONS OF DIFLUOROMETHANE AND TETRAFLUOROETHANE

[75] Inventors: Mark B. Shiflett, Newark, Del.; Donald B. Bivens, Kennett Square, Pa.

[73] Assignee: E. I. Du Pont de Nemours and Company, Wilmington, Del.

[21] Appl. No.: 436,777

[22] Filed: May 8, 1995

Related U.S. Application Data

[63] Continuation of Ser. No. 143,761, Nov. 1, 1993, abandoned, which is a continuation of Ser. No. 963,310, Oct. 16, 1992, Pat. No. 5,290,466, which is a continuation-in-part of Ser. No. 787,872, Oct. 31, 1991, abandoned, and a continuation of Ser. No. 871,673, Apr. 21, 1992, abandoned.

[51] Int. Cl.$^6$ ..................................................... C09K 5/04
[52] U.S. Cl. ................................................ 252/67; 62/114
[58] Field of Search ........................... 252/67, DIG. 9; 62/114

[56] References Cited

U.S. PATENT DOCUMENTS

| | | | |
|---|---|---|---|
| 4,174,295 | 11/1979 | Bargigia et al. | 252/305 |
| 4,810,403 | 3/1989 | Bivens et al. | 252/67 |
| 4,971,712 | 11/1990 | Gorski et al. | 252/68 |
| 4,978,467 | 12/1990 | Shankland et al. | 252/69 |
| 4,983,312 | 1/1991 | Tamura et al. | 252/67 |
| 5,053,155 | 10/1991 | Mahler | 252/68 |
| 5,115,868 | 5/1992 | Dougherty et al. | 169/45 |
| 5,290,466 | 3/1994 | Shiflett | 252/67 |

FOREIGN PATENT DOCUMENTS

| | | |
|---|---|---|
| 430170 | 6/1991 | European Pat. Off. . |
| 430169 | 6/1991 | European Pat. Off. . |
| 0451692 | 10/1991 | European Pat. Off. . |
| 64-79288 | 3/1989 | Japan . |
| 3170586 | 7/1991 | Japan . |
| 3-170585 | 7/1991 | Japan . |
| 3170587 | 7/1991 | Japan . |
| 3-168284 | 10/1991 | Japan . |
| 4-139293 | 5/1992 | Japan . |
| 92-01762 | 2/1992 | WIPO . |
| 92-11338 | 7/1992 | WIPO . |
| 92-16597 | 10/1992 | WIPO . |

*Primary Examiner*—Christine Skane

[57] ABSTRACT

Compositions of difluoromethane, 1,1,1,2-tetrafluoroethane, and 1,1,2,2-tetrafluoroethane are useful as refrigerants, aerosol propellants, heat transfer edia, gaseous dielectrics, fire extinguishing agents, expansion agents for polymers such as polyolefins and polyurethanes, and as power cycle fluids.

Near azeotropic compositions comprise admixtures of effective amounts of difluoromethane and tetrafluoroethane to form a near azeotropic composition. Such compositions are useful as refrigerants, cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

6 Claims, 2 Drawing Sheets

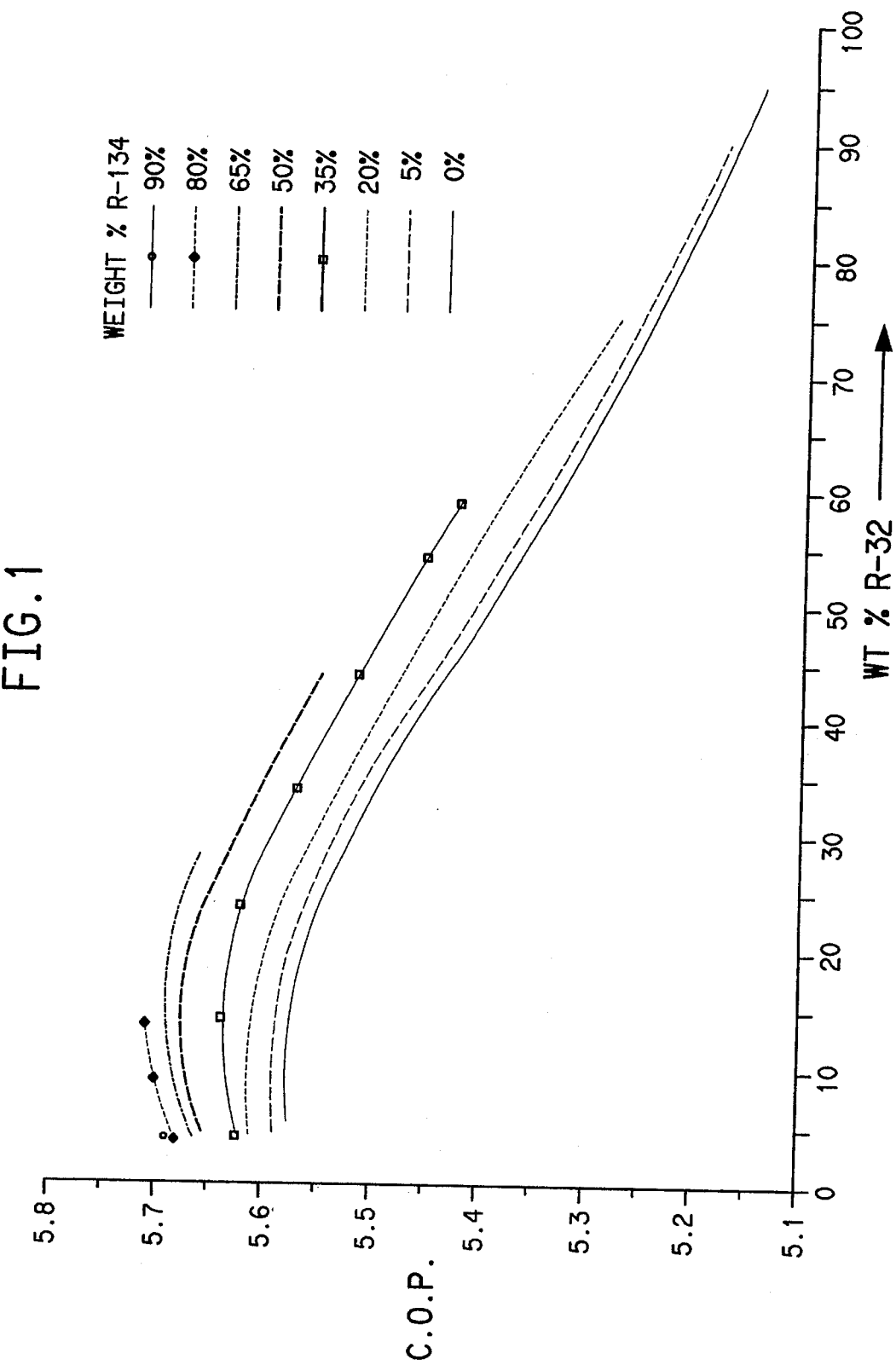

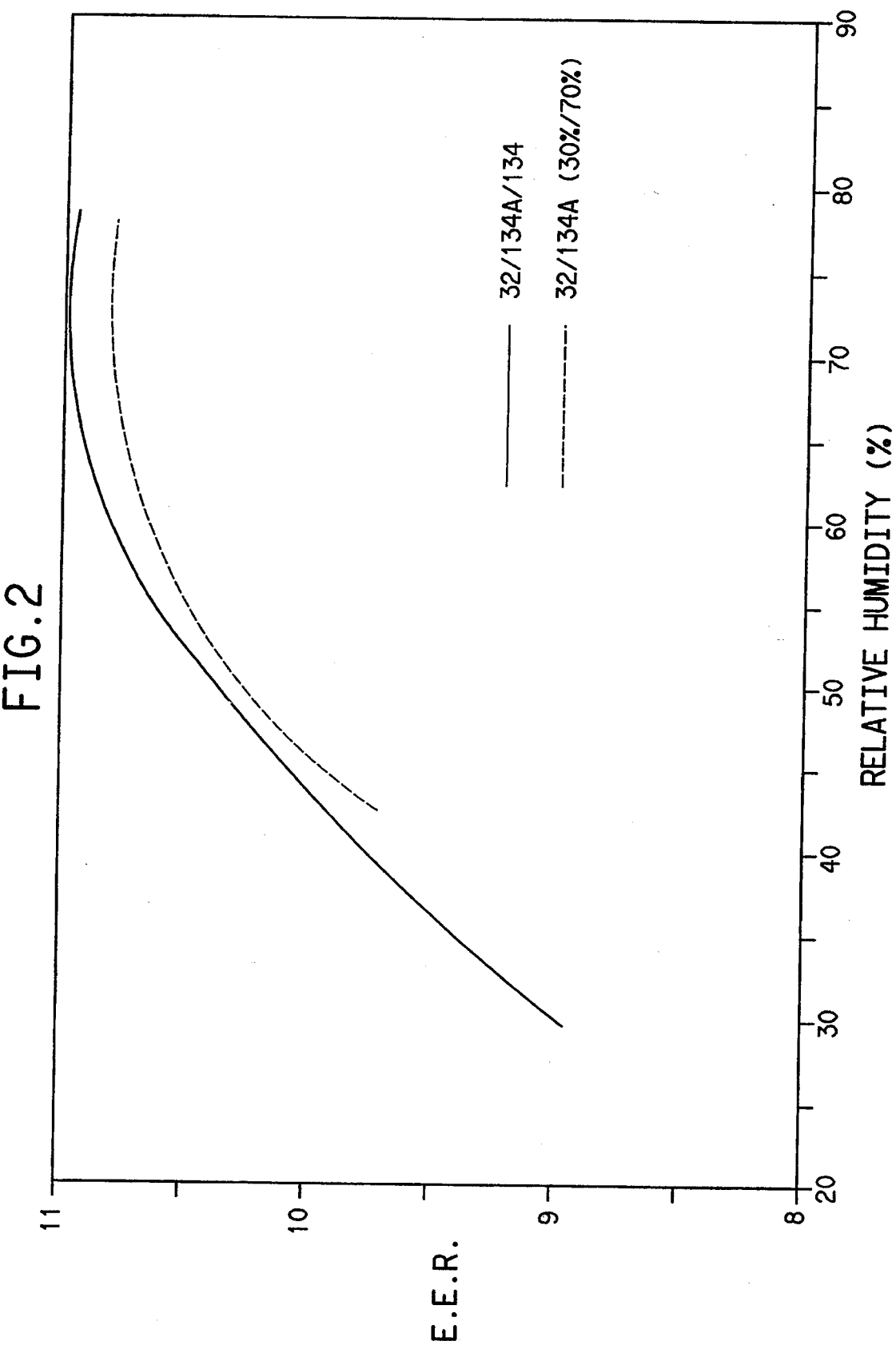

COMPOSITIONS OF DIFLUOROMETHANE AND TETRAFLUOROETHANE

This application is a continuation of application Ser. No. 08/143,761, filed Nov. 1, 1993, now abandoned, which is a continuation of application Ser. No. 07/963,310, filed on Oct. 16, 1992, now U.S. Pat. No. 5,290,466, which is a continuation-in-part of application Ser. No. 07/787,872, filed Oct. 31, 1991, now abandoned, and a continuation of application Ser. No. 07/871,673, filed Apr. 21, 1992, now abandoned.

FIELD OF THE INVENTION

The present invention relates to compositions of fluorinated hydrocarbons and more specifically to compositions that comprise difluoromethane and tetrafluoroethane. As used herein, tetrafluoroethane includes 1,1,1,2-tetrafluoroethane, or 1,1,2,2-tetrafluoroethane, or mixtures thereof. Such compositions are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents. These compositions are potentially environmentally safe substitutes for Refrigerant-22, a commercial refrigerant.

BACKGROUND OF THE INVENTION

Concern over the ozone depletion potential of certain halocarbons has resulted in a search for alternative compounds having lower ozone depletion potentials. Recently the long-term environmental effects of chlorofluorocarbons and even hydrochlorofluorocarbons have come under substantial scientific scrutiny, because it has been postulated that these materials decompose in the stratosphere, under the influence of ultraviolet radiation, to release chlorine atoms. Chlorine atoms are theorized to undergo chemical reaction in the stratosphere, which could deplete the stratospheric ozone layer, which shields the earth from harmful ultraviolet radiation. A substantial reduction of stratospheric ozone could have a serious deleterious impact on the quality, of life on earth.

There is a continuing need in this art for new materials having new combinations of properties for use in the aforementioned applications. In view of the potential environmental problem associated with stratospheric ozone depletion, there is a particular need for new materials possessing properties which make them useful in the subject applications and which are also potentially environmentally safe.

There is a limit to the number of single fluorinated hydrocarbon substances which could be candidates as environmentally safe materials. Mixtures of known materials, however, might be used if the desired combination of properties could be found in a given mixture. Also, certain .types of compositions can be formulated that are quite useful due to the temperature glide created through the heat exchangers, that is, the difference in the inlet and outlet temperatures of heat exchangers. These compositions exhibit novel properties that can be useful in increasing the energy efficiency of refrigeration equipment.

Fluorinated hydrocarbons have many uses, one of which is as a refrigerant. In refrigeration applications, a refrigerant is often lost during operation through leaks in shaft seals, hose connections, solder joints, and broken lines. In addition, the refrigerant may be released to the atmosphere during maintenance procedures on refrigeration equipment. Accordingly, it is desirable, when possible, to use a single fluorinated hydrocarbon, an azeotrope, or a near azeotropic composition that includes one or more fluorinated hydrocarbons as a refrigerant.

Fluorinated hydrocarbons may also be used as a cleaning agent or solvent to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent.

Preferably, cleaning agents should have a low boiling point, non-flammability, low toxicity, and high solvency power so that flux and flux-residues can be removed without damaging the substrate being cleaned. Further, it is desirable that cleaning agents that include a fluorinated hydrocarbon be near azeotropic so that they do not tend to fractionate upon boiling or evaporation. If the cleaning agent were not near azeotropic, the more volatile components of the cleaning agent would preferentially evaporate, and the cleaning agent could become flammable or could have less-desirable solvency, properties, such as lower rosin flux solvency and lower inertness toward the electrical components being cleaned. The near azeotropic property is also desirable in vapor degreasing operations because the cleaning agent is generally redistilled and reused for final rinse cleaning.

Near azeotropic compositions of fluorinated hydrocarbons are also useful as blowing agents in the manufacture of close-cell polyurethane, phenolic and thermoplastic foams. Insulating foams require blowing agents not only to foam the polymer, but more importantly to utilize the low vapor thermal conductivity of the blowing agents, which is an important characteristic for insulation value.

Aerosol products employ both single component fluorinated hydrocarbons and near azeotropic compositions of fluorinated hydrocarbons as propellant vapor pressure attenuators in aerosol systems. Near azeotropic mixtures, with their essentially constant compositions and vapor pressures, are useful as solvents and propellants in aerosols.

Near azeotropic compositions that include fluorinated hydrocarbons are also useful as heat transfer media, gaseous dielectrics, fire extinguishing agents, power cycle working fluids such as for heat pumps, inert media for polymerization reactions, fluids for removing particulates from metal surfaces, and as carrier fluids that may be used, for example, to place a fine film of lubricant on metal parts.

Near azeotropic compositions that include fluorinated hydrocarbons are further useful as buffing abrasive detergents to remove buffing abrasive compounds from polished surfaces such as metal, as displacement drying agents for removing water such as from jewelry, or metal parts, as resist-developers in conventional circuit manufacturing techniques employing chlorine-type developing agents, and as strippers for photoresists when used with, for example, a chlorohydrocarbon such as 1,1,1-trichloroethane or trichloroethylene.

SUMMARY OF THE INVENTION

The present invention relates to the discovery of refrigerant compositions of difluoromethane. 1,1,1,2-tetrafluoroethane, and 1,1,2,2-tetrafluoroethane. The invention also relates to the discovery of near azeotropic refrigerant compositions comprising effective amounts of difluoromethane and tetrafluoroethane to form a near azeotropic composition. As used herein, tetrafluoroethane includes 1,1,1,2-tetrafluoroethane, or 1,1,2,2-tetrafluoroethane, or mixtures thereof.

The inventive compositions can be also used as cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents.

DETAILED DESCRIPTION OF THE DRAWINGS

FIG. 1 is a graph of coefficient of performance (COP) versus refrigerant compositions for various compositions of difluoromethane, 1,1,1,2-tetrafluoroethane, and 1,1,2,2-tetrafluoroethane.

FIG. 2 is a graph of energy efficiency ratio (EER) versus percent relative humidity for compositions of difluoromethane and 1,1,1,2-tetrafluoroethane, and compositions of difluoromethane, 1,1,1,2-tetrafluoroethane and 1,1,2,2-tetrafluoroethane.

DESCRIPTION OF THE INVENTION

In one aspect of the invention, the compositions, or mixtures, comprise 5–90 weight percent difluoromethane (HFC-32, or $CH_2F_2$), 5–90 weight percent 1,1,1,2-tetrafluoroethane (HFC-134a, or $CH_2FCF_3$), and 5–90 weight percent 1,1,2,2-tetrafluoroethane (HFC-134, or $CHF_2CHF_2$). The preferred composition of the invention includes 20–60 weight percent difluoromethane, 10–70 weight percent 1,1,1,2-tetrafluoroethane, and 10–70 weight percent 1,1,2,2-tetrafluoroethane. Particularly preferred compositions include from 19 to 24 weight percent difluoromethane, from 28 to 48 weight percent 1,1,1,2-tetrafluoroethane, and from 28 to 48 weight percent 1,1,2,2,-tetrafluoroethane.

The inventive compositions are used to produce refrigeration by condensing the compositions and thereafter evaporating the condensate in the vicinity of a body to be cooled.

The inventive compositions may also be used to produce heat by condensing the refrigerant in the vicinity of the body to be heated and thereafter evaporating the refrigerant.

The use of compositions that exhibit temperature glides through counter current heat exchangers offer potential energy efficiency advantages that may not be exhibited by pure component or azeotropic compositions.

The inventive compositions have zero ozone depletion potentials (ODP) as shown in Table 1. The compositions have little to no effect on the global warming potential. The global warming potentials (GWP) of the components of the compositions are listed in Table 1: Refrigerant-22 is provided for comparison.

TABLE 1

| Refrigerant | Chemical Formula | ODP | GWP |
|---|---|---|---|
| HCFC-22 | $CHF_2Cl$ | .05 | .34 |
| HFC-134a | $CF_3CH_2F$ | .0 | .28 |
| HFC-134 | $CHF_2CHF_2$ | .0 | * |
| HFC-32 | $CH_2F_2$ | .0 | .11 |

*not measured

In another aspect of the invention, the near azeotropic compositions, or mixtures, comprise effective mounts of difluoromethane (HFC-32) and tetrafluoroethane to form substantially constant boiling, near azeotropic compositions.

As used herein, the term tetrafluoroethane shall mean HFC-134, or HFC-134a, or mixtures of HFC-134 and HFC-134a.

Effective amounts of difluoromethane and tetrafluoroethane to form a near azeotropic composition, when defined in terms of weight percent of the components at a specific pressure or temperature, include the following.

Substantially constant-boiling, near azeotropic compositions of HFC-32 and HFC-134a comprise 1 to 10 weight percent HFC-32 and 90 to 99 weight percent HFC-134a at 111.5±10.6 psia (768.8±73.1 kPa). These compositions boil at 25° C. at this pressure. A preferred composition of the invention comprises 10 wt. % HFC-32 and 90 wt % HFC-134a.

Substantially constant boiling, near azeotropic compositions of HFC-32 and HFC-134 comprise 1 to 6 weight percent HFC-32 and to 94 to 99 weight percent HFC-134 at 84.5±6 psia (582.6±41.4 k.Pa). These compositions boil at about 25° C. at this pressure. A preferred composition of the invention comprises 6 wt. % HFC-32 and 94 wt. % HFC-134.

Substantially constant boiling, near azeotropic compositions of HFC-32 and mixtures of HFC-134a and HFC-134 include the following: 9 weight percent HFC-32, 1–7 weight percent HFC-134 and 84–90 weight percent HFC-134a, at 117.9–119.5 psia; 8 weight percent HFC-32, 1–23 weight percent HFC-134 and 69–91 weight percent HFC-134a, at 111.5–117.3 psia; 7 weight percent HFC-32, 1–50 weight percent HFC-134, and 43–92 weight percent HFC-134a, at 102.8–115.0 psia; 6 weight percent HFC-32, 1–93 weight percent HFC-134, and 1–93 weight percent HFC-134a, at 90.7–112.6 psia; 5 weight percent HFC-32, 1–94 weight percent HFC-134, and 1–94 HFC-134a, at 88.4–110.3 psia; 4 weight percent HFC-32, 1–95 weight percent HFC-134, and 1–95 weight percent HFC-134a, at 86.0–107.9 psia; 3 weight percent HFC-32, 1–96 weight percent HFC-134, and 1–96 weight percent HFC-134a, at 83.6–105.5 psia; 2 weight percent HFC-32. 1–97 weight percent HFC-134, and 1–97 weight percent HFC-134a, at 81.2–103.0 psia; and 1 weight percent HFC-32, 1–98 weight percent HFC-134, and 1–98 weight percent HFC-134a, at 78.8–100.6 psia. These compositions boil at about 25° C. at these pressures. A preferred composition comprises a 9 wt. % HFC-32, 7 wt. % HFC-134, and 84 wt. % HFC-134a having a vapor pressure of 117.9 psia (813 kPa) at 25° C.

For purposes of this invention, "effective amount" is defined as the amount of each component of the inventive compositions which, when combined, results in the formation of a near azeotropic composition. This definition includes the amounts of each component, which amounts may vary depending on the pressure applied to the composition so long as the near azeotropic compositions continue to exist at the different pressures, but with possible different boiling points. Therefore, "effective amount" includes the amounts of each component of the compositions of this invention which form near azeotropic compositions at pressures other than the pressure described herein.

By "near azeotropic" composition is meant a substantially constant boiling, liquid admixture of two or more substances that behaves substantially as a single substance.

It is recognized in the art that a composition is near azeotropic if, after 50 wt. % of the composition is removed such as by evaporation or boiling off, the difference in vapor pressure between the original composition and the composition remaining after 50 wt. % of the original composition has been removed is 10% or less, when measured in absolute units. By absolute units is meant measurements of pressure in, for example, psia, atmospheres, bars, torr, dynes per square centimeter, millimeters of mercury, inches of water, and other equivalent terms well known in the art.

Therefore, included in this invention are compositions of effective amounts of HFC-32 and HFC-134a, or effective amounts of HFC-32 and HFC-134, or effective amounts of HFC-32 and mixtures of HFC-134a and HFC-134, such that after 50 wt. % of an original composition is evaporated or boiled off to produce a remaining composition, the difference in the vapor pressure between the original composition and the remaining composition is 10% or less.

Effective amounts of difluoromethane and tetrafluoroethane to form a near azeotropic composition can also be defined as including amounts of these components such that the percentage difference in dew point pressure and bubble point pressure of the composition at a constant temperature is about 10% or less. It is recognized in the art that a small percent difference in the dew point pressure and bubble point pressure at a constant temperature, such as a difference of about 10% or less, is an indication that the composition is near azeotropic. It has been found unexpectedly that certain compositions of HFC-32 and HFC-134a; HFC-32 and HFC-134; and HFC-32 and mixtures of HFC-134a and HFC-134 have differences in dew point and bubble point pressure of about 10% or less, at a constant temperature.

Therefore, included in this invention are compositions of effective amounts of HFC-32 and HFC-134a, or compositions of effective amounts of HFC-32 and HFC-134, or compositions of effective amounts of HFC-32 and mixtures of HFC-134a and HFC-134, such that the compositions have a difference in dew point pressure and bubble point pressure of 10% or less, at a constant temperature.

The near azeotropic compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention.

EXAMPLE 1

Evaluation of the refrigeration properties of the ternary compositions of the invention versus Refrigerant-22 and versus compositions of HFC-32 and HFC-134a are shown in Table 2. The data are generated based on a refrigeration cycle operating at a condensing temperature of 120° F., and an evaporation temperature of 40° F., with 25° F. of subcooling, 0° F. of superheat, and a 3.5 cubic foot displacement compressor.

TABLE 2

Comparison of Refrigeration Performance

| Refrigerant Composition (weight %) | | | Refrigeration Capacity (Btu/min) | Energy Efficiency (C.O.P.) |
|---|---|---|---|---|
| HCFC-22 | | | | |
| 100.0 | | | 373.9 | 5.47 |
| HFC-32 | HFC-134a | HFC-134 | | |
| 5.0 | 95.0 | 0 | 260.7 | 5.58 |
| 15.0 | 85.0 | 0 | 304.3 | 5.58 |
| 25.0 | 75.0 | 0 | 343.7 | 5.55 |
| 35.0 | 65.0 | 0 | 380.8 | 5.50 |
| 45.0 | 55.0 | 0 | 416.0 | 5.43 |
| 55.0 | 45.0 | 0 | 450.0 | 5.37 |
| 65.0 | 35.0 | 0 | 483.7 | 5.31 |
| 75.0 | 25.0 | 0 | 516.2 | 5.25 |
| 85.0 | 15.0 | 0 | 549.8 | 5.19 |
| 95.0 | 5.0 | 0 | 559.6 | 5.15 |
| 5.0 | 90.0 | 5.0 | 258.6 | 5.59 |
| 15.0 | 80.0 | 5.0 | 301.4 | 5.59 |
| 25.0 | 70.0 | 5.0 | 340.4 | 5.57 |
| 35.0 | 60.0 | 5.9 | 376.9 | 5.51 |
| 45.0 | 50.0 | 5.0 | 411.3 | 5.44 |
| 55.0 | 40.0 | 5.0 | 444.6 | 5.38 |
| 65.0 | 30.0 | 5.0 | 476.8 | 5.32 |
| 75.0 | 20.0 | 5.0 | 508.2 | 5.26 |
| 85.0 | 10.0 | 5.0 | 539.1 | 5.20 |
| 90.0 | 5.0 | 5.0 | 549.0 | 5.18 |
| 5.0 | 75.0 | 20.0 | 252.1 | 5.61 |
| 15.0 | 65.0 | 20.0 | 292.7 | 5.62 |
| 25.0 | 55.0 | 20.0 | 330.2 | 5.59 |
| 35.0 | 45.0 | 20.0 | 364.6 | 5.54 |
| 45.0 | 35.0 | 20.0 | 397.5 | 5.48 |
| 55.0 | 25.0 | 20.0 | 428.5 | 5.41 |
| 65.0 | 15.0 | 20.0 | 458.0 | 5.34 |
| 75.0 | 5.0 | 20.0 | 484.7 | 5.28 |
| 5.0 | 60.0 | 35.0 | 245.1 | 5.62 |
| 15.0 | 50.0 | 35.0 | 284.0 | 5.64 |
| 25.0 | 40.0 | 35.0 | 319.8 | 5.62 |
| 35.0 | 30.0 | 35.0 | 352.9 | 5.57 |
| 45.0 | 20.0 | 35.0 | 384.2 | 5.52 |
| 55.0 | 10.0 | 35.0 | 413.4 | 5.45 |
| 60.0 | 5.0 | 35.0 | 427.5 | 5.42 |
| 5.0 | 45.0 | 50.0 | 238.2 | 5.65 |
| 15.0 | 35.0 | 50.0 | 275.3 | 5.67 |
| 25.0 | 25.0 | 50.0 | 309.6 | 5.65 |
| 35.0 | 15.0 | 50.0 | 340.0 | 5.61 |
| 45.0 | 5.0 | 50.0 | 371.2 | 5.55 |
| 5.0 | 30.0 | 65.0 | 231.1 | 5.66 |
| 15.0 | 20.0 | 65.0 | 266.5 | 5.69 |
| 25.0 | 10.0 | 65.0 | 299.3 | 5.68 |
| 30.0 | 5.0 | 65.0 | 314.9 | 5.66 |
| 5.0 | 15.0 | 80.0 | 223.9 | 5.68 |
| 10.0 | 10.0 | 80.0 | 240.9 | 5.70 |
| 15.0 | 5.0 | 80.0 | 257.5 | 5.71 |
| 5.0 | 5.0 | 90.0 | 218.9 | 5.69 |
| 24.0 | 38.0 | 38.0 | 316.0 | 5.62 |
| 19.0 | 40.5 | 40.5 | 299.0 | 5.64 |
| 24.0 | 48.0 | 28.0 | 321.0 | 5.61 |
| 24.0 | 28.0 | 48.0 | 311.0 | 5.64 |

Coefficient of performance (C.O.P.) is intended to mean the ratio of the refrigeration capacity to the compressor work. It is a measure of refrigerant energy efficiency.

These ternary compositions behave non-ideally and exhibit temperature glides (difference in inlet and exit temperature) through the condenser and evaporator. These glides in temperature vary from 3° F. to 18° F. depending on the composition. For azeotropes, the temperature glide is 0, and in the case of a non-azeotropic mixture the temperature glide is higher. However, these temperature glides should not pose any significant problems to equipment manufacturers, and in fact may be useful to designers to increase the energy efficiency of refrigeration equipment.

Also, the compositions may exhibit similar refrigeration capacity and energy efficiency compared with R-22, depending on the composition.

Turning now to FIG. 1, there is shown a graph of COP versus refrigerant composition for various combinations of HFC-32, HFC-134a, and HFC-134. The graph is a summary of the data presented in Table 2. Compositions of the refrigerants in FIG. 1 are determined by selecting a weight percent of HFC-32 from the x-axis of the graph, and the weight percent of HFC-134 from the intersection of a vertical line from the x-axis with a curve shown in FIG. 1, with the weight percent of HFC-134a being determined by subtracting the sum of the weight percents of HFC-32 and HFC-134 from 100. This Figure shows that the COP of a composition of HFC-32 and HFC-134a increases by adding HFC-134 to the HFC-32/HFC-134a composition. Therefore, the present invention provides a composition of HFC-32/HFC-134a/HFC-134 that has a higher energy efficiency (COP) than HFC-32/HFC-134a.

The preferred ranges of the inventive compositions are those that provide a refrigeration capacity within about 25% of the refrigeration capacity of HCFC-22. These preferred ranges include about 20–60 weight percent difluoromethane, 10–70 weight percent 1,1,1,2-tetrafluoroethane, and 10–70 weight percent 1,1,2,2-tetrafluoroethane.

Particularly preferred compositions include from 19 to 24 weight percent difluoromethane, from 28 to 48 weight percent 1,1,1,2-tetrafluoroethane, and from 28 to 48 weight percent 1,1,2,2.-tetrafluoroethane. These compositions are particularly preferred because they achieve the best balance between capacity and COP for these three components, while maintaining non-flammability. Difluoromethane increases the capacity of mixtures of 1,1,1,2-tetrafluoroethane and 1,1,2,2-tetrafluoroethane, but also increases flammability and decreases COP. Therefore, it is important that a composition of difluoromethane, 1,1,1,2-tetrafluoroethane and 1,1,2,2-tetrafluoroethane be selected wherein a balance is struck between flammability, capacity and COP such that the composition is a suitable replacement for R-22.

EXAMPLE 2

The energy efficiency of a refrigerant composition of HFC-32/HFC-134a/HFC-134 versus a refrigerant composition of HFC-32/HFC-134a was evaluated in a window air conditioner that had a rated capacity of 18,000 BTU per hour.

The air conditioner was charged with a composition of 30 weight percent HFC-32 and 70 weight percent HFC-134a, and then placed in an environmentally-controlled room where conditions were maintained at a constant temperature of 90° F. The humidity in the room, which was held constant during testing, could be varied from approximately 30 to 80% relative humidity. The energy efficiency of the refrigerant was measured over a range of humidities, and the data from the measurements are shown in FIG. 2.

The energy efficiency, ratio (EER) of the refrigerant is defined as the ratio of the refrigeration capacity of the refrigerant through the evaporator, in BTU per hour, to the energy consumption of the air conditioner, in watts.

EXAMPLE 3

The procedure in Example 2 was repeated, except that the refrigerant composition was changed to 40 weight percent HFC-32, 33 weight percent HFC-134a, and 27 weight percent HFC-134. The data from measurements of the energy efficiency ratio of the refrigerant are shown in FIG. 2.

FIG. 2 shows that the EER of a refrigerant composition of HFC-32 and HFC-134a can be increased by adding HFC-134 to the composition.

EXAMPLE 4

A vessel is charged with an initial composition of HFC-32 and HFC-134a at 25° C., and the vapor pressure of the composition is measured. The vapor composition is allowed to leak from the vessel, while the temperature is held constant at 25° C., until 50 weight percent of the initial composition is removed, at which time the vapor pressure of the composition remaining in the vessel is measured. The results are summarized below.

TABLE 3

| Run | Composition, wt % | | Vapor Pressure, psia (kPa) at 25° C. | | |
|---|---|---|---|---|---|
| No. | HFC-32 | HFC-134a | Initial | after 50% leak | % change |
| 1 | 1 | 99 | 100.8 (695) | 99.3 (685) | 1.5 |
| 2 | 2 | 98 | 103.3 (712) | 100.3 (692) | 2.9 |
| 3 | 5 | 95 | 110.5 (762) | 103.7 (715) | 6.2 |
| 4 | 8 | 92 | 117.5 (810) | 107.3 (740) | 8.7 |
| 5 | 9 | 91 | 119.8 (826) | 108.6 (749) | 9.4 |
| 6 | 10 | 90 | 122.1 (842) | 109.9 (758) | 10.0 |

For comparison, a known non-azeotropic composition, namely 50 wt % chlorodifluoromethane (HCFC-22) and 50 wt % 1,2-dichloro-1,1,2,2-tetrafluoroethane (CFC-114) has an initial vapor pressure of 116.9 psia (806 kPa) at 25° C. After 50 weight percent of the composition has been removed via a vapor leak, the remaining composition has a vapor pressure of 92.7 psia (639 kPa) at 25° C., a change of 20.7%.

EXAMPLE 5

A study of dew point and bubble point pressures for various compositions indicates that the differences in dew point and bubble point pressures of compositions of HFC-32 and HFC-134a are very, small with respect to the differences in dew point and bubble point pressures of a known, non-azeotropic, binary composition of HCFC-22 and CFC-114. These data confirm the near azeotropic behavior of the compositions of this invention.

TABLE 4

| Refrigerant Composition | Pressures psia (kPa) at 25° C. | | | |
|---|---|---|---|---|
| | Bubble Point | Dew Point | Delta P | % Delta P |
| HCFC-22 and HFC-114 | | | | |
| (50+ 50) | 116.9 (806) | 68.8 (474) | 48.2 | 41.2 |
| HFC-32 and HFC-134a | | | | |
| (1 + 99) | 100.8 (695) | 99.4 (685) | 1.4 | 1.4 |
| (2 + 98) | 103.3 (712) | 100.5 (693) | 2.8 | 2.7 |
| (5 + 95) | 110.5 (762) | 103.8 (716) | 6.7 | 6.1 |
| (8 + 92) | 117.5 (810) | 107.2 (739) | 10.3 | 8.8 |
| (9 + 91) | 119.8 (826) | 108.3 (747) | 11.5 | 9.6 |
| (10 + 90) | 122.1 (842) | 109.4 (754) | 12.6 | 10.4 |

EXAMPLE 6

Refrigeration Performance

At low evaporator temperatures, such as below −10° F. (−23° C.), HFC-134a is not a good replacement for CFC-12 because the refrigeration capacity of HFC-134a is lower than CFC-12. This makes it difficult to use HFC-134a as a replacement for CFC-12 in existing equipment operating at low evaporator temperatures. As shown below, the refrigeration capacity of HFC-134a is improved by replacing pure HFC-134a with a constant boiling composition of HFC-32 and HFC-134a.

The following is a comparison of refrigeration performance for CFC-12, HFC-134a, and two substantially constant boiling compositions of HFC-32 and HFC-134a.

TABLE 5

|  | CFC-12 | HFC-134a | HFC-32 + HFC-134a (5 + 95) | HFC-32 + HFC-134a (10 + 9.0) |
|---|---|---|---|---|
| Evaporator |  |  |  |  |
| temp., °F. | −30 | −30 | −30 | −30 |
| temp., °C. | −34.4 | −34.4 | −34.4 | −34.4 |
| pressure, psia | 12.0 | 10.5 | 11.6 | 12.7 |
| pressure, kPa | 82.7 | 72.4 | 80.0 | 87.6 |
| Condenser |  |  |  |  |
| temp., °F. | 110 | 110 | 110 | 110 |
| temp., °C. | 43.3 | 43.3 | 43.3 | 43.3 |
| pressure, psia | 151 | 161 | 174 | 187 |
| pressure, kpa | 1041 | 1110 | 1200 | 1289 |
| Compressor Discharge |  |  |  |  |
| temp., °F. | 293 | 269 | 277 | 286 |
| temp., °C. | 145 | 132 | 136 | 141 |
| Capacity relative to CFC-12 | 1.0 | 0.9 | 1.0 | 1.1 |

The data in Table 5 are based on return gas to the compressor at 65° F., and a compressor efficiency of 75%.

The data in Table 5 show that a near azeotropic composition of 5% HFC-32 and 95% HFC-134a provides the same refrigeration capacity as CFC-12 at a low temperature condition, such as an evaporator at −30° F. A near azeotropic composition of 10% HFC-32+90% HFC-134a provides an increase in capacity of 10% versus CFC-12 and a 20% increase versus HFC-134a.

Capacity is intended to mean the change in enthalpy of the refrigerant in the evaporator per pound of refrigerant circulated, i.e., the heat removed by the refrigerant in the evaporator per time.

EXAMPLE 7

A vapor leak test as in Example 4 shows that certain compositions of HFC-32 and HFC-134 are near azeotropic.

TABLE 6

| Run | Composition, wt % | | Vapor Pressure, psia (kPa) at 25° C. | | % |
|---|---|---|---|---|---|
| No. | HFC-32 | HFC-134 | Initial | after 50% leak | change |
| 1 | 1 | 99 | 78.5 (541) | 76.9 (530) | 2.0 |
| 2 | 3 | 97 | 83.3 (574) | 78.6 (542) | 5.6 |
| 3 | 5 | 95 | 88.1 (607) | 80.4 (554) | 8.7 |
| 4 | 6 | 94 | 90.5 (624) | 81.4 (561) | 10.0 |

The data in Table 6 indicate that a composition of HFC-32 and HFC-134 that contains up to 6% HFC-32 is constant boiling.

EXAMPLE 8

A study of dew point and bubble point pressures as in Example 5 indicates that the differences in dew point and bubble point pressures of certain compositions of HFC-32 and HFC-134 are 10% or less, which confirms the near azeotropic behavior of the compositions of this invention.

TABLE 7

| Refrigerant Composition | Pressures psia (kPa) at 25° C. | | | |
|---|---|---|---|---|
|  | Bubble Point | Dew Point | Delta P | % Delta P |
| HFC-32 and HFC-134 |  |  |  |  |
| (1 + 99) | 78.5 (541) | 77.0 (531) | 1.5 | 1.9 |
| (2 + 98) | 80.9 (558) | 78.0 (538) | 2.9 | 3.6 |
| (3 + 97) | 83.4 (575) | 78.9 (544) | 4.5 | 5.4 |
| (4 + 96) | 85.7 (591) | 79.8 (550) | 5.9 | 6.9 |
| (5 + 95) | 88.1 (607) | 80.8 (557) | 7.3 | 8.3 |
| (6 + 94) | 90.5 (624) | 81.8 (564) | 8.7 | 9.6t |

EXAMPLE 9

The refrigeration performance of a near azeotropic composition of 6 wt. % HFC-32 and 94 wt. % HFC-134 is evaluated as in Example 6.

TABLE 8

|  | HFC-134 | HFC-32 + HFC-134 (6 + 94) |
|---|---|---|
| Evaporator |  |  |
| temp., °F. | 20.0 | 20.0 |
| temp., °C. | −6.7 | −6.7 |
| pressure, psia | 25.2 | 28.8 |
| pressure, kPa | 174 | 199 |
| Condenser |  |  |
| temp., °F. | 130 | 130 |
| temp., °C. | 54.4 | 54.4 |
| pressure, psia | 173 | 193 |
| pressure, kPa | 1193 | 1331 |
| Compressor Discharge |  |  |
| temp., °F. | 165 | 174 |
| temp., °C. | 74 | 79 |
| Capacity relative to HFC-134 | 1.0 | 1.15 |

In this Example, the compressor has an isentropic efficiency of 75%, and there is no subcooling and no superheat.

The data in Table 8 show that a composition of 6 wt % HFC-32 and 94 wt % HFC-134 exhibits a 15% increase in refrigeration capacity when compared to HFC-134 alone.

EXAMPLE 10

A vapor leak test as in Example 4 shows that certain compositions of HFC-32 and a mixture of HFC-134a and HFC-134 are near azeotropic.

TABLE 9

| | Composition, wt % | | | Vapor Pressure, psia (kPa) at 25° C. | | |
|---|---|---|---|---|---|---|
| Run No. | HFC-32 | HFC-134 | HFC-134a | Initial | after 50% leak | % change |
| 1 | 9 | 7 | 84 | 117.9 (813) | 106.6 (735) | 9.6 |
| 2 | 9 | 5 | 86 | 118.5 (817) | 107.2 (739) | 9.5 |
| 3 | 9 | 1 | 90 | 119.5 (824) | 108.3 (747) | 9.4 |
| 4 | 8 | 23 | 69 | 111.5 (769) | 101.0 (696) | 9.4 |
| 5 | 8 | 20 | 72 | 112.3 (774) | 101.8 (702) | 9.3 |
| 6 | 8 | 1 | 91 | 117.3 (809) | 107.0 (738) | 8.8 |
| 7 | 7 | 50 | 43 | 102.8 (709) | 93.0 (641) | 9.5 |
| 8 | 7 | 45 | 48 | 104.0 (717) | 94.3 (650) | 9.3 |
| 9 | 7 | 1 | 92 | 115.0 (793) | 105.8 (730) | 8.0 |
| 10 | 6 | 93 | 1 | 90.7 (625) | 81.6 (563) | 10.0 |
| 11 | 6 | 1 | 93 | 112.6 (776) | 104.6 (721) | 7.1 |
| 12 | 5 | 94 | 1 | 88.4 (610) | 80.6 (556) | 8.8 |
| 13 | 5 | 1 | 94 | 110.3 (761) | 103.4 (713) | 6.3 |
| 14 | 4 | 1 | 95 | 107.9 (744) | 102.3 (705) | 5.2 |
| 15 | 4 | 95 | 1 | 86.0 (593) | 79.7 (550) | 7.3 |
| 16 | 3 | 1 | 96 | 105.5 (727) | 101.2 (698) | 4.1 |
| 17 | 3 | 96 | 1 | 83.6 (576) | 78.8 (543) | 5.7 |
| 18 | 2 | 97 | 1 | 81.2 (560) | 77.9 (537) | 4.1 |
| 19 | 2 | 1 | 97 | 103.0 (710) | 100.1 (690) | 2.8 |
| 20 | 2 | 49 | 49 | 92.4 (637) | 88.7 (612) | 4.0 |
| 21 | 1 | 98 | 1 | 78.8 (543) | 77.1 (532) | 2.2 |
| 22 | 1 | 1 | 98 | 100.6 (694) | 99.0 (683) | 1.6 |

The data in Table 9 indicate that certain compositions of HFC-32 and mixtures of HFC-134a and HFC-134 are near azeotropic.

EXAMPLE 11

A study of dew point and bubble point pressures as in Example 5 indicates that certain compositions of HFC-32 and mixtures of HFC-134a and HFC-134 are near azeotropic.

TABLE 10

| | Pressures (psia) at 25° C. | | |
|---|---|---|---|
| Refrigerant Composition | Bubble Point | Dew Point | % Delta P |
| HFC-32 + HFC-134 + HFC-134a | | | |
| 9 + 7 + 84 | 117.9 (813) | 106.1 (732) | 10.0 |
| 8 + 23 + 69 | 111.5 (769) | 100.4 (692) | 10.0 |
| 7 + 50 + 43 | 102.8 (709) | 92.5 (638) | 10.0 |
| 6 + 93 + 1 | 90.7 (625) | 82.0 (565) | 9.6 |
| 5 + 94 + 1 | 88.4 (610) | 81.0 (558) | 8.4 |
| 5 + 1 + 94 | 110.3 (761) | 103.5 (714) | 6.2 |

EXAMPLE 12

The following is a comparison of the refrigerant performance, as in Example 6, of HFC-32 and a mixture of HFC-134 and HFC-134a.

TABLE 11

| | CFC-12 | HFC-134a | HFC-32 + HFC-134 + HFC-134a | |
|---|---|---|---|---|
| | | | (9 + 7 + 84) | (7 + 50 + 43) |
| Evaporator | | | | |
| temp., °F. | −30 | −30 | −30 | −30 |
| temp., °C. | −34.4 | −34.4 | −34.4 | −34.4 |
| pressure, psia | 12.0 | 10.5 | 12.1 | 10.0 |
| pressure, kPa | 82.7 | 72.4 | 83.4 | 69.0 |
| Condenser | | | | |
| temp., °F. | 110 | 110 | 110 | 110 |
| temp., °C. | 43.3 | 43.3 | 43.3 | 43.3 |
| pressure, psia | 151 | 161 | 182.1 | 162 |
| pressure, kPa | 1041 | 1110 | 1256 | 1117 |
| Compressor Discharge | | | | |
| temp., °F. | 293 | 269 | 285 | 288 |
| temp., °C. | 145 | 132 | 141 | 142 |
| Capacity relative to CFC-12 | 1.0 | 0.9 | 1.09 | 0.94 |

These data show that compositions of HFC-32 and mixtures of HFC-134 and HFC-134a have a higher refrigeration capacity than HFC-134a alone.

The novel near azeotropic compositions of HFC-32 and HFC-134a, or HFC-32 and HFC-134, or HFC-32 and mixtures of HFC-134a and HFC-134, may be used to produce refrigeration by condensing the compositions and thereafter evaporating the condensate in the vicinity of the body to be cooled.

The novel near azeotropic compositions may also be used to produce heat by condensing the refrigerant in the vicinity of the body to be heated and thereafter evaporating the refrigerant.

The use of near azeotropic compositions eliminates the problem of component fractionation and handling in systems operations, because these compositions behave essentially as a single substance. Several of the novel near azeotropic compositions also offer the advantage of being essentially non-flammable.

In addition to refrigeration applications, the novel constant boiling compositions of the invention are also useful as aerosol propellants, heat transfer media, gaseous dielectrics, fire extinguishing agents, expansion agents for polyolefins and polyurethanes and as power cycle working fluids.

OTHER ADDITIVES AND APPLICATIONS

Additives such as lubricants, corrosion inhibitors, stabilizers, dyes and other appropriate materials may be added to the compositions of the invention for a variety of purposes provided they do not have an adverse influence on the composition, for their intended applications.

In addition to refrigeration applications, the constant boiling compositions of the invention are also useful as: aerosol propellants, heat transfer media, gaseous dielectrics, fire extinguishing agents, expansion agents for polymers such as polyolefins and polyurethanes, and power cycle working fluids.

Other components, such as aliphatic hydrocarbons having a boiling point of −80° to 0° C., hydrofluorocarbonalkanes having a boiling point of −80° to 0° C., hydrofluoropropanes having a boiling point of between −80° to 0° C., hydrocarbon esters having a boiling point between −80° to 0° C., hydrochlorofluorocarbons having a boiling point between −80° to 0° C., hydrofluorocarbons having a boiling point of −80° to 0° C., hydrochlorocarbons having a boiling point between −80° to 0° C., chlorocarbons and perfluorinated compounds, can be added to the azeotropic or azeotrope-like compositions described above without substantially changing the properties thereof, including the constant boiling behavior, of the compositions. Examples of such components include the following.

| COMPOUND | FORMULA | Boiling Point, °C. |
|---|---|---|
| HFC-23 | $CHF_3$ | −82° C. |
| HC-290 | $CH_3CH_2CH_3$ | −42° C. |
| HCFC-124 | $CHClFCF_3$ | −12° C. |
| FC-600 | $CH_3CH_2CH_2CH_3$ | 0° C. |

We claim:

1. A mixture consisting essentially of a substantially constant boiling, near-azeotropic composition consisting of 1–6 weight percent difluoromethane and 94–9 weight percent 1,1,2,2-tetrafluoroethane, wherein when the temperature is adjusted to about 25° C., the composition boils at a vapor pressure of about 78–91 psia, and wherein when 50 weight percent of the composition is evaporated, the vapor pressure of the composition changes by 10 percent or less.

2. A substantially constant boiling, near-azeotropic composition consisting essentially of difluoromethane, 1,1,2,2-tetrafluoroethane and 1,1,1,2-tetrafluoroethane, in the following proportions at about 25° C.: 4 weight percent difluoromethane, 1–95 weight percent 1,1,2,2-tetrafluoroethane and 1–95 weight percent 1,1,1,2-tetrafluoroethane, said composition boiling at a vapor pressure of about 86.0–107.9 psia; 3 weight percent difluoromethane, 1–96 weight percent 1,1,2,2-tetrafluoroethane and 1–96 weight percent 1,1,1,2-tetrafluoroethane, said composition boiling at a vapor pressure of about 83.6–105.5 psia; 2 weight percent difluoromethane, 1–97 weight percent 1,1,2,2-tetrafluoroethane and 1–97 weight percent 1,1,1,2-tetrafluoroethane, said composition boiling at a vapor pressure of about 81.2–103.0 psia; or 1 weight percent difluoromethane, 1–98 weight percent 1,1,2,2-tetrafluoroethane and 1–98 weight percent 1,1,1,2-tetrafluoroethane, said composition boiling at a vapor pressure of about 78.8–100.6 psia, wherein when 50 weight percent of the composition is evaporated, the vapor pressure of the composition changes by 10 percent or less.

3. A process for producing refrigeration, comprising condensing a composition of claim 1, and thereafter evaporating said composition in the vicinity of the body to be cooled.

4. A process for producing refrigeration, comprising condensing a composition of claim 2 and thereafter evaporating said composition in the vicinity of the body to be cooled.

5. A process for producing heat comprising condensing a composition of claim 1 in the vicinity of a body to be heated, and thereafter evaporating said composition.

6. A process for producing heat comprising condensing a composition of claim 2 in the vicinity of a body to be heated, and thereafter evaporating said composition.

* * * * *